(12) United States Patent
Mei

(10) Patent No.: US 8,443,904 B2
(45) Date of Patent: May 21, 2013

(54) CONTINUOUS COMMUNICATIONS CONDUIT APPARATUS AND METHOD

(76) Inventor: Daniel Lu Mei, Sugarland, TX (US)

( * ) Notice: Subject to any disclaimer, the term of this patent is extended or adjusted under 35 U.S.C. 154(b) by 0 days.

(21) Appl. No.: 13/526,745

(22) Filed: Jun. 19, 2012

(65) Prior Publication Data

US 2012/0285716 A1 Nov. 15, 2012

Related U.S. Application Data

(62) Division of application No. 13/526,745, filed on Jun. 19, 2012, which is a division of application No. 12/278,684, filed on Aug. 7, 2008, now Pat. No. 8,225,876.

(51) Int. Cl.
*E21B 19/16* (2006.01)

(52) U.S. Cl.
USPC ............. 166/380; 166/242.1; 285/47; 285/41

(58) Field of Classification Search
USPC .......... 166/380, 242.1; 138/109, 155; 285/32, 285/41, 390, 47, 55
See application file for complete search history.

(56) References Cited

U.S. PATENT DOCUMENTS

| 2,259,232 | A | * | 10/1941 | Stone | 175/325.5 |
| 3,943,618 | A | * | 3/1976 | Perkins | 29/407.1 |
| 4,415,184 | A | * | 11/1983 | Stephenson et al. | 285/47 |
| 5,862,866 | A | * | 1/1999 | Springer | 166/380 |
| 6,273,474 | B1 | * | 8/2001 | DeLange et al. | 285/55 |
| 6,817,633 | B2 | * | 11/2004 | Brill et al. | 285/333 |

* cited by examiner

*Primary Examiner* — Daniel P Stephenson
(74) *Attorney, Agent, or Firm* — David B. Dickinson

(57) ABSTRACT

A continuous communications conduit for use in a well is disclosed. A first 101 and second 102 conduit section are threadably engaged and a weldment is formed 200. A heat shield conduit 220 can be disposed within a bore (111, 112) of a conduit section (101, 102) between a first conduit section shoulder 151 and a second conduit section shoulder 152. A first 301, second 302, and third 303 conduit section can be threadably engaged and a weldment 400 formed. An electrical conductor 300 can be disposed in a bore of the conduit sections (301, 302, 303). A heat shield conduit 320 can be disposed between a first conduit section shoulder 351 and a second conduit section shoulder 352. Optionally, an elastomeric stabilizer (410, 420) may be utilized.

19 Claims, 5 Drawing Sheets

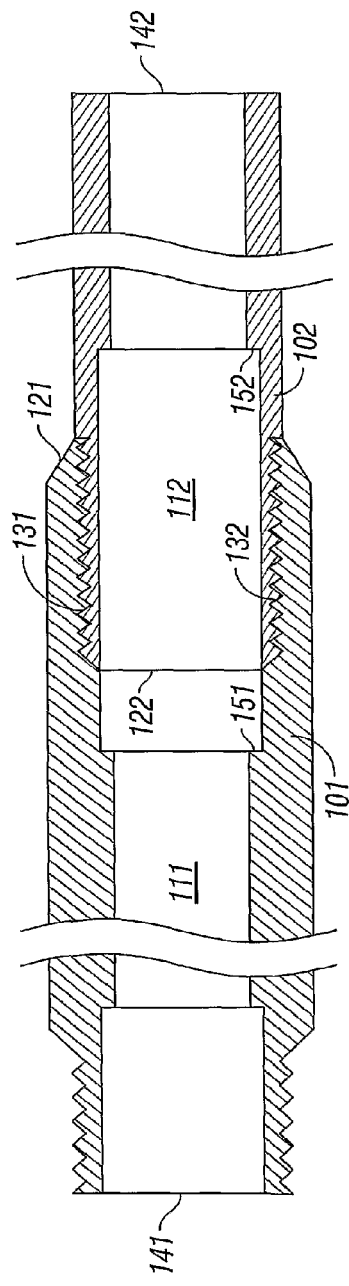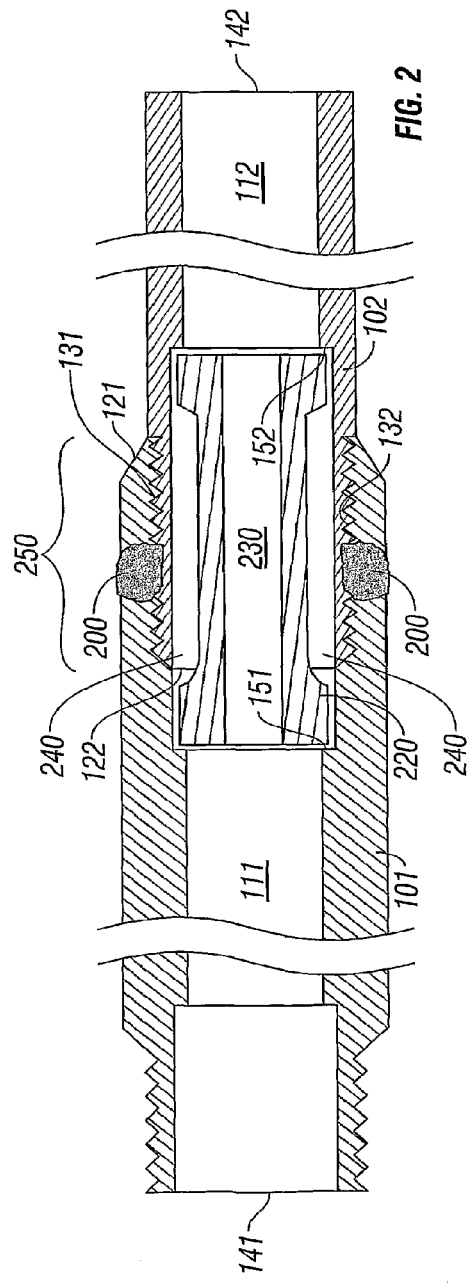

CONTINUOUS COMMUNICATIONS CONDUIT APPARATUS AND METHOD

CROSS-REFERENCE TO RELATED APPLICATION

This divisional application, Ser. No. 13/526,745, filed Jun. 19, 2012, is a divisional application of application Ser. No. 12/278,684, filed 07 Aug. 2008, now U.S. Pat. No. 8,225,876, issued Jul. 24, 2012 all of which are incorporated by reference (including all priority claims) as if copied herein in their entirety.

BACKGROUND OF THE INVENTION

The present invention relates to tubing and method of fabrication of such tubing; and more specifically a continuous communications conduit economically formed by joining a plurality of short seamless tubing sections end to end.

The pursuit of petroleum and other in-ground substances has created a need for downhole monitoring products. A variety of techniques have been utilized for downhole monitoring to aid in the completion and production of a wellbore, monitor reservoir or formation conditions, estimate quantities of petroleum products, operate devices in the wellbore, or determine the physical condition of the wellbore or downhole devices. Placement of temporary or permanent mechanical or electronic devices, such as temperature sensors, pressure sensors, flow rate sensors, vibration sensors, accelerometers, or hydrophones in the wellbore or formation, can aid in these techniques. All of these downhole measuring, sensing, or actuating devices can be deployed on a small diameter continuous tubing. In addition to downhole measuring, other downhole, underwater, sub-sea, and aerial applications of tubing exist. For example, there is a need in aerial applications to install an optical fiber or optical fiber core with multiple fibers into steel, copper, or aluminum tubing. Fiber optic cables sheathed in lightweight aluminum tubing have been utilized alongside aerial high voltage power cable systems to save land use and cable installation fees. The multitude of uses of tubing results in a demand for an economical continuous conduit.

Downhole monitoring systems can provide eyes to the reservoir to improve well productivity, reduce operating costs, and illustrate reservoir performance on a real-time basis. Downhole tools are typically designed to maintain high reliability, cost competitiveness, flexibility, and ease of use. As the productive life of an oil or gas well may be 10 or more years, some more permanent downhole equipment may need to last at least that long to satisfy expectations. Thus, the supporting tubing structure should be capable of withstanding the adverse conditions experienced downhole for an extended period of time.

SUMMARY OF THE INVENTION

The present invention is directed to a continuous communications conduit for use in a well. The continuous communications conduit may be made from two or more conduit sections which may be threadably attached and permanently joined by welding. An electrical conductor surrounded at each joinder location by a heat shield conduit can be disposed in a bore of the continuous communications conduit.

In one embodiment, a continuous communications conduit for use in a well includes a first conduit section with a longitudinal bore therethrough having an external threaded section on a first end and an internal threaded section on an opposing second end, a second conduit section having an external threaded end threadably attached to the second threaded end of the first conduit section and a longitudinal bore therethrough in communication with the longitudinal bore of the first conduit section, and a weldment joining at least a portion of the engaged threads of the first conduit section to the engaged threads of the second conduit section. The continuous communications conduit can further include a heat shield conduit disposed within the longitudinal bore of the first and second conduit sections. The heat shield conduit can extend adjacent an area where the internal threads of the first conduit section engage the external threads of the second conduit section. The heat shield conduit can be further disposed between a first conduit section shoulder and a second conduit section shoulder.

In another embodiment, a continuous communications conduit for use in a well is prepared by a process of engaging an internal threaded end of a first conduit section to an external threaded end of a second conduit section and welding at least a portion of the engaged threads of the first conduit section to the engaged threads of the second conduit section.

In yet another embodiment, a continuous communications conduit for use in a well is prepared by a process of engaging an internal threaded end of a first conduit section with a longitudinal bore therethrough to an external threaded end of a second conduit section with a longitudinal bore therethrough, disposing a heat shield conduit within the longitudinal bore of the first and second conduit sections, the heat shield conduit extending adjacent an area where the threads of the first conduit section engage the threads of the second conduit section, and welding at least a portion of the engaged threads of the first conduit section to the engaged threads of the second conduit section. The heat shield conduit can be further disposed between a first conduit section shoulder and a second conduit section shoulder.

In another embodiment, a continuous thin-walled communications conduit for use in a well includes a first conduit section having a threaded end and a longitudinal bore therethrough, a second conduit section having a threaded end and a longitudinal bore therethrough, a third conduit section having a threaded first end threadably attached to the threaded end of the first conduit section and an opposing threaded second end threadably attached to the threaded end of the second conduit section, the third conduit section having a longitudinal bore therethrough in communication with the longitudinal bores of the first and second conduit sections, a first weldment joining at least a portion of the engaged threads of the third conduit section to the engaged threads of the first conduit section, and a second weldment joining at least a portion of the engaged threads of the third conduit section to the engaged threads of the second conduit section. The heat shield conduit contained within the longitudinal bore of the first, second, and third conduit sections can extend substantially a longitudinal length of the third conduit section. The heat shield conduit can be further disposed between a first conduit section shoulder and a second conduit section shoulder.

In another embodiment, a method of fabricating a cable sheath includes forming a threaded connection by attaching a threaded end of a first conduit section with a longitudinal bore therethrough to a threaded end of a second conduit section with a longitudinal bore therethrough, inserting a heat shield conduit with a longitudinal bore therethrough adjacent the threaded connection, the heat shield conduit disposed within the longitudinal bores of the conduit sections, and forming a weldment joining the first conduit section to the second conduit section at an area of the threaded connection. The heat shield conduit can be further disposed between a first conduit section shoulder and a second conduit section shoulder. The method can further include inserting an electrical conductor through the longitudinal bore of the first and second conduit sections before forming the threaded connection. The method can further include inserting an electrical conductor through the longitudinal bore of the first and second conduit sections after forming the threaded connection or inserting an electrical conductor through the longitudinal bore of the first and second conduit sections after forming the weldment. The electrical conductor may be inserted through the heat shield conduit.

In yet another embodiment, a method of forming a continuous communications conduit may further include forming by continuous plastic deposition a sheath around the electrical conductor before inserting the electrical conductor through the longitudinal bore of the first and second conduit sections. A method of forming a continuous communications conduit may further include coating at least a portion of an exterior surface of at least one of the conduit sections with a plastic by continuous deposition.

In another embodiment, a method of fabricating a continuous communications conduit includes disposing an electrical conductor through a longitudinal bore of a first conduit section, a longitudinal bore of a heat shield conduit, and a longitudinal bore of a second conduit section, forming a threaded connection by attaching an external threaded end of the first conduit section to an internal threaded end of the second conduit section, the heat shield conduit disposed within the longitudinal bores of the conduit section and adjacent to the threaded connection, and forming a weldment joining at least a portion of the engaged threads of the first conduit section to the engaged threads of the second conduit section. The heat shield conduit can be further disposed between a first conduit section shoulder and a second conduit section shoulder. The electrical conductor can be an optical fiber. A method of fabricating a continuous communications conduit can further include coating at least a portion of an exterior surface of at least one of the conduit sections with a plastic, elastomer, or any material adequate for the required application environment.

In yet another embodiment, a continuous thin-walled communications conduit for use in a well includes an electrical conductor disposed through a longitudinal bore of a first conduit section, a longitudinal bore of a heat shield conduit, a longitudinal bore of a second conduit section, and a longitudinal bore of a third conduit section, the first conduit section having an external threaded section on a first and a second end, the second conduit section having an external threaded section on a first and a second end, the third conduit section having an internal threaded first section threadably attached to one of the external threaded sections of the first conduit section and an opposing internal threaded second section threadably attached to one of the external threaded sections of the second conduit section, wherein the longitudinal bore of third conduit section is in communication with the longitudinal bores of the first and second conduit sections, a weldment joining at least a first portion of the engaged threads of the third conduit section to the engaged threads of the first conduit section and the weldment joining at least a second portion of the engaged threads of the third conduit section to the engaged threads of the second conduit section, and the heat shield conduit disposed within the longitudinal bores of the first, second, and third conduit sections and extending substantially from a first conduit section shoulder located proximate the threadably attached end of the first conduit section to a second conduit section shoulder located proximate the threadably attached end of the second conduit section. The first conduit section shoulder can be formed in an inner surface of the first conduit section and the second conduit section shoulder is formed in an inner surface of the second conduit section. An outer diameter of a first and a second section located at a first and an opposing second end of the heat shield conduit can be greater than that of an outer diameter at a middle section.

In another embodiment, at least a portion of an outer diameter of a section of the heat shield conduit adjacent the weldment is smaller than an inner diameter of the longitudinal bore of the first conduit section. A continuous thin-walled communications conduit for use in a well can further include an elastomeric stabilizer located proximate an end of the heat shield conduit with an inner diameter substantially the size of an outer diameter of the electrical conductor and an outer diameter substantially the size of an inner diameter of the longitudinal bore of the conduit section containing the elastomeric stabilizer.

In yet another embodiment, a method of fabricating a continuous thin-walled communications conduit for use in a well includes disposing an electrical conductor through a longitudinal bore of a first conduit section, a longitudinal bore of a heat shield conduit, a longitudinal bore of a third conduit section, and a longitudinal bore of a second conduit section, attaching an external threaded section located on an end of the first conduit section to an internal threaded section on a first end of the third conduit section attaching an external threaded section located on an end of the second conduit section to an internal threaded section on an opposing second end of the third conduit section, the heat shield conduit disposed in the longitudinal bore of the first, second, and third conduit sections and disposed between a first conduit section shoulder located proximate the threadably attached end of the first conduit section and a second conduit section shoulder located proximate the threadably attached end of the second conduit section after the attachment steps, and forming a weldment joining at least a first portion of the engaged threads of the third conduit section to the engaged threads of the first conduit section and the weldment joining at least a second portion of the engaged threads of the third conduit section to the engaged threads of the second conduit section. The heat shield conduit can be displaced into the longitudinal bore of the first, second, and third conduit sections by contact with at least one of the shoulders. The weldment can be a single weld joint or a plurality of weld joints.

In another embodiment, the method of fabricating a continuous thin-walled communications conduit for use in a well can further include axially loading the first and second conduit sections before forming the weldment. The method of fabricating a continuous thin-walled communications conduit for use in a well can further include winding at least a portion of the continuous thin-walled communications conduit on a spool.

In yet another embodiment, the method of fabricating a continuous thin-walled communications conduit for use in a well includes disposing an elastomeric stabilizer on the electrical conductor, the elastomeric stabilizer having an external diameter less than the inner diameter of the longitudinal bore containing the elastomeric stabilizer.

In another embodiment, a method of fabricating a continuous thin-walled communications conduit for use in a well includes obtaining an plurality of sections of the continuous thin-walled communications conduit, disposing an electrical conductor through a longitudinal bore of a first conduit section, a longitudinal bore of a heat shield conduit, a longitudinal bore of a third conduit section, and a longitudinal bore of a second conduit section, locating a threaded end of the first conduit section adjacent a threaded end of the second conduit section, disposing the third conduit section over the threaded end of the first and second conduit sections, said third conduit section having an inner diameter greater than an outer diameter of the first and second conduit sections, locating the heat shield conduit adjacent the threaded ends of the first and second conduit sections and between a first conduit section shoulder and a second conduit section shoulder, and forming a weldment joining the third conduit section to the first conduit section and the second conduit section.

In another embodiment, a method of fabricating a continuous thin-walled communications conduit for use in a well further includes disposing the electrical conductor through a longitudinal bore of a fourth conduit section, a longitudinal bore of a second heat shield conduit, and a longitudinal bore of a fifth conduit section, locating a second threaded end of the second conduit section adjacent a threaded end of a fourth conduit section, disposing the fifth conduit section over the threaded end of the second and fourth conduit sections, said fifth conduit section having an inner diameter greater than an outer diameter of the second and fourth conduit sections, locating the second heat shield conduit adjacent the threaded ends of the second and fourth conduit sections and between a second shoulder in the second conduit section and a fourth conduit section shoulder, and forming a second weldment joining the fifth conduit section to the second conduit section and the fourth conduit section.

BRIEF DESCRIPTION OF THE DRAWINGS

FIG. 1 is a sectional view of a continuous communications conduit, according to one embodiment of the invention.

FIG. 2 is a sectional view of a heat shield conduit disposed within the continuous communications conduit of FIG. 1 after a weldment is formed, according to one embodiment of the invention.

DETAILED DESCRIPTION

Figure 3:
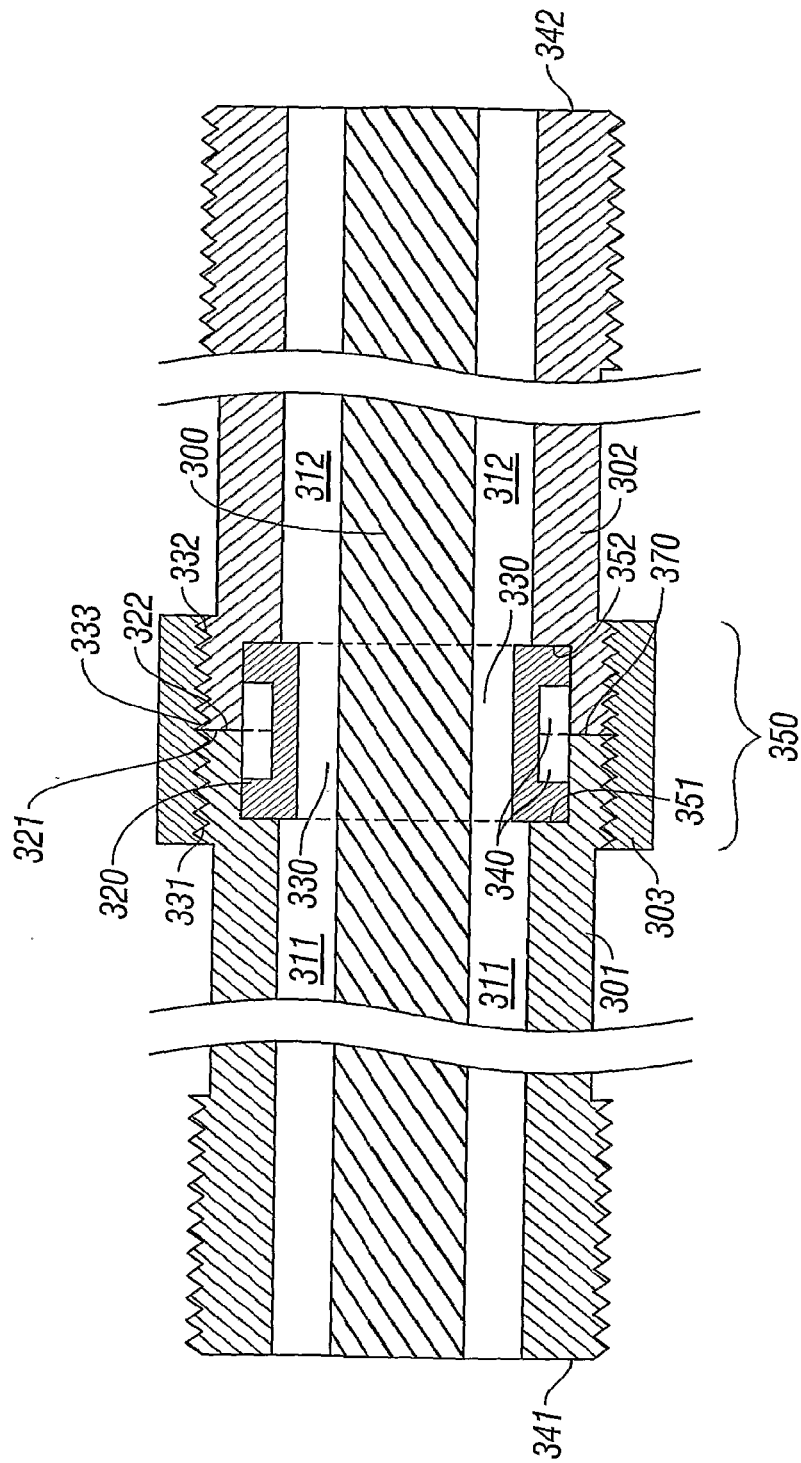
FIG. 3 is a sectional view of an electrical conductor disposed within a continuous communications conduit and a heat shield conduit, according to one embodiment of the invention.

The present invention is directed to a continuous communications conduit and a method for making said conduit, for example. As used herein, continuous is defined as being uninterrupted in extent. Conduit sections, which may be of differing lengths, shapes, sizes, or composition, may be joined so as to form an uninterrupted length of continuous communications conduit.

As used herein, the term communications conduit shall refer to any pipe, tube, duct, or other object with a bore therethrough for conveying fluids, such as water, hydraulic fluid, or petroleum, or for at least partially enclosing an optical fiber and/or electrical wire, cable, or conductor. Communications conduit can be used as hydraulic coiled tubing for chemical, steam, or hydraulic fluid injection. Communications conduit may be used as a cable sheath, for example, enclosing an electrical submersible pump (ESP) power cable with a seamless steel communications conduit to form a sheath around a single copper conductor, three stranded conductor, or parallel conductor, each with an insulation jacket. A conduit section, which may be used to form a continuous communications conduit, is not limited to straight sections nor is it required to be of a tubular shape. A conduit section can consist of any desired shape, dimension, or properties.

A conduit section can, for example, be constructed of steel, stainless-steel, or titanium. Stainless-steel can be any suitable grade, non-limiting examples are American Iron and Steel Institute (AISA) grade 304, 310, 316, or 317 stainless-steel. Titanium is light weight, high strength, and has good temperature and corrosion resistance, which may be useful in a downhole environment. Titanium may be alloyed with other materials, manganese or ferrochromium for example. It may be desirable to construct a conduit section from an alloy that may be heat resistant, retain its strength at high heats, resist oxidation or corrosion, have a high creep strength, and/or be non-magnetic. A non-limiting example of such an alloy is one composed of approximately 76% nickel, 0.20% copper, 7.5% iron, 15.5% chromium, 0.25% silicon, 0.25% manganese, 0.08% carbon, 0.007% sulfur. All of the materials above are given by way of example only and the invention is not so limited. A conduit section may consist of any material suitable for use in a well.

If a conduit section is formed of a substance not suitable for use in a well or other reservoir environment, the conduit section may be coated with another substance to allow in-well or downhole use. A conduit section may be seamless or welded. A conduit section may be any length or internal or external diameter.

The term seamless refers to lacking or having a minimal longitudinal seam or no weldment in the circumference. A conduit section can be a section of sucker rod tubing or production tubing. A conduit section can be thin-walled, as know to those skilled in the art.

Referencing the figures, where like numerals indicate like elements, one embodiment of the invention is shown in FIG. 1. A first 101 and second 102 conduit section each contain a longitudinal bore (111, 112 respectively). The longitudinal bores (111, 112) do not have to be of equivalent lengths, shapes, sizes, or composition. A longitudinal bore can be formed during original manufacture or after by machining, for example. As used herein, the term bore shall refer to any void extending through a conduit section. There is no limitation that the bore be substantially disposed through the axis of the conduit, nor is the bore required to be straight and may be tortuous. The first 101 and second 102 conduit sections may also be different lengths, shapes, sizes, or composition. The first conduit section 101 can include at least one end 121 with an internal threaded section 131. The second conduit section 102 can include at least one end 122 with an external threaded section 132. As used herein, the term threaded section shall refer to any thread form. It may be a fine, coarse, or shallow thread form. It may or may not have an undercut. A threaded section may be machined into the conduit section material. A threaded section may be a separate threaded connector attached, by any means known in the art, to an end of a conduit section. A conduit section may have a self-tapping threaded section so as to threadably engage a non-threaded end of a second conduit section. Either of the first 101 or second 102 conduit sections can be an adapter for connecting dissimilar thread types or sizes. A conduit section can be a manifold or a splitter, said manifold or splitter may have three or more ends.

To form the embodiment of the continuous communications conduit in FIG. 1, at least a portion of the internal threaded section 131 of the first conduit section 101 may be engaged to at least a portion of the external threaded section 132 of the second conduit section 102. The conduit sections may be engaged by any means known in the art, which may include manual or automatic means. Once engaged, the first 111 and second 112 longitudinal bores of the conduit sections (101, 102) may allow communication therebetween.

After engagement, a weldment 200 (in FIG. 2) may be formed to join at least a portion of the threads 131 of the first conduit section 101 to the threads 132 of the second conduit section 102. The weldment 200 may be formed anywhere in the zone 250 where the threads of the first conduit section are engaged to the threads of the second conduit section. A weldment 200 is shown in the figures as uniformly shaped, but the invention is not so limited. The weldment 200 is also shown in one zone, but a weldment may be formed anywhere, including a portion of or the entire threaded area 250.

As used herein, the term weldment shall refer to an area or point where two surfaces are joined or fused by bringing at least one of the two substantially abutting surfaces to a molten state. The molten state may be achieved by applying heat or another energy source, optionally with pressure and/or an intermediate or filler material. For example, the area to be fused may be gold plated to allow the gold to be a filler material. The heat or energy source to create a weldment or weld joint may, for example, be provided by a flame, electrical arc, chemical reaction, or electrical resistance. Some non-limiting examples of welding processes are arc, gas, resistance, thermit, induction, induction coil, electron beam, and forge welding. A weldment can include a butt weld. Furthermore, a weldment may consist of more than one area or point joined by applying heat or another energy source. At least one portion of the area or point to be joined may include an intermediate or filler material. A weldment may be formed by a manual or automatic process. In addition to a first weldment being formed between the threaded areas, at least a second weldment (not shown) may be formed, for example, where an outer surface of one conduit section abuts a second conduit section. A weldment can fill and seal any gaps between a threaded and an unthreaded area.

After the engagement and weldment formation on at least two conduit sections (101, 102), the welded plurality of individual conduit sections may then be considered a continuous communications conduit.

Either opposing end of the joined first 101 or second 102 conduit section (141, 142 respectively) may be engaged to another conduit section or an end of an existing continuous communications conduit. First conduit section 101 is shown in FIG. 1 as having an external threaded end 141, but the invention is not limited to an internal or external threaded section. For example, second conduit section 102 is shown with an unthreaded end 142, but the invention is similarly not so limited.

Following the steps above, multiple threaded conduit sections may be engaged and a weldment formed therebetween to create a desired length of a continuous communications conduit. Two or more conduit sections can be engaged then welded, or a plurality of conduit sections can be threadably attached and the weldments formed in a second stage.

Furthermore, a heat shield conduit 220 (FIG. 2) may be used. As used herein, a heat shield conduit shall refer to any conduit that may aid in preventing energy or heat from traversing the heat shield conduit wall. A heat shield conduit can be split or otherwise constructed so as to allow disposition around an electrical conductor (if present) without threading the electrical conductor through an inner bore 230 of the heat shield conduit 220. A heat shield conduit 220 (in FIG. 2) may be disposed within the longitudinal bores (111, 112) of either or both of the first and second conduit sections (101, 102). This may occur before the first 101 and second 102 conduit sections are threadably engaged. One of the many benefits of a heat shield conduit 220 is it may protect an object, such as an electrical conductor (not shown), located within the bore 230 of said heat shield conduit 220 from heat, energy, or even frictional contact damage. A heat shield conduit 220 can be formed of the same material as one of either of the conduit sections (101, 102) or from a different material, for example steel, stainless-steel, titanium, a heat resistant alloy, or ceramic. The heat shield conduit 220 may be of an appropriate size, shape, and design to be contained within a longitudinal bore (111, 112) of a conduit section (101, 102).

If the heat shield conduit 220 is susceptible to reaching a high temperature or molten state during the weldment 200 forming process or an insulating area is otherwise desired, a void 240 may be desirable between the heat shield conduit 220 and the area or point were the weldment 200 is being formed. This void 240 can be achieved by any means, for example by selecting a heat shield conduit 220 with at least a portion of an external diameter being smaller than the internal diameter of a bore of an adjacent conduit section, by the exterior diameter tapering downward at a desired location, or by a heat shield conduit with a cutout or notch in its external diameter (for example, see FIG. 2). The void may be filled with a heat or energy resistant material if so desired.

Any means may be used to locate the heat shield conduit 220 adjacent the area or point where the weldment 200 is being formed or other area where a heat shield conduit 220 is desired. For example, to help locate the heat shield conduit 220 to the desired location, a shoulder (151, 152) may be formed into a conduit section (101, 102). The shoulder (151, 152) may be machined into a conduit section (101, 102) or be formed through any means known in the art.

In one embodiment, a first shoulder 151 and second shoulder 152 may be formed in the first and second conduit sections (101, 102) adjacent the ends (121, 122) to be engaged. The first and second conduit section shoulders (151, 152) may be located on an interior surface of the respective abutting conduit sections (101, 102) to allow the heat shield conduit 220 to fit and/or be disposed therebetween. The heat shield conduit 220 may be disposed in a desired location by contact with either or both of the first and second conduit section shoulders (151, 152). However, the heat shield conduit 220 is not required to be in contact with both or either of the first and second conduit section shoulders (151, 152) as shown.

An individual conduit section (101, 102), electrical conductor (not shown), or a portion or the entirety of the continuous communications conduit may optionally be coated, jacketed, or encased with a plastic, elastomer, or other protective material (not shown) adequate for the required application environment. A plastic coating may be deposited by continuous plastic deposition. This can occur before, during, or after the engagement and/or weldment forming stages. The plastic may, for example, be nylon. The plastic can be chosen to be wear resistant or be a sacrificial wear material. The plastic jacket, encasement, or coating may protect at least a portion of a conduit section (101, 102), electrical conductor, or length of continuous communications conduit from causing or receiving damage. Damage can result from abrasive contact with the well equipment or wellbore (cased or uncased) or from exposure to a downhole fluid.

Figure 4:
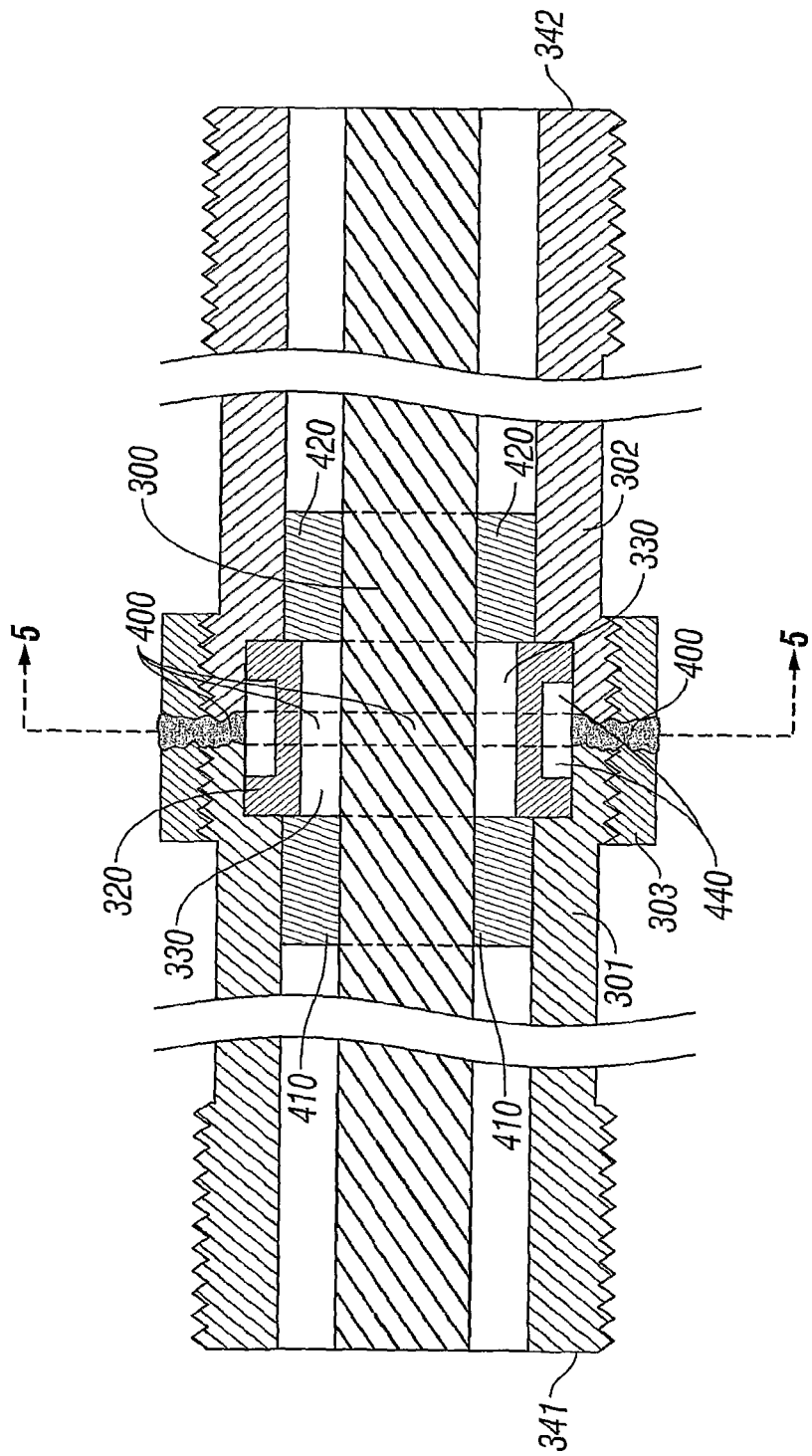
FIG. 4 is a sectional view of the continuous communications conduit of FIG. 3 after a weldment is formed and two elastomeric stabilizers are added, according to one embodiment of the invention.
Figure 5:
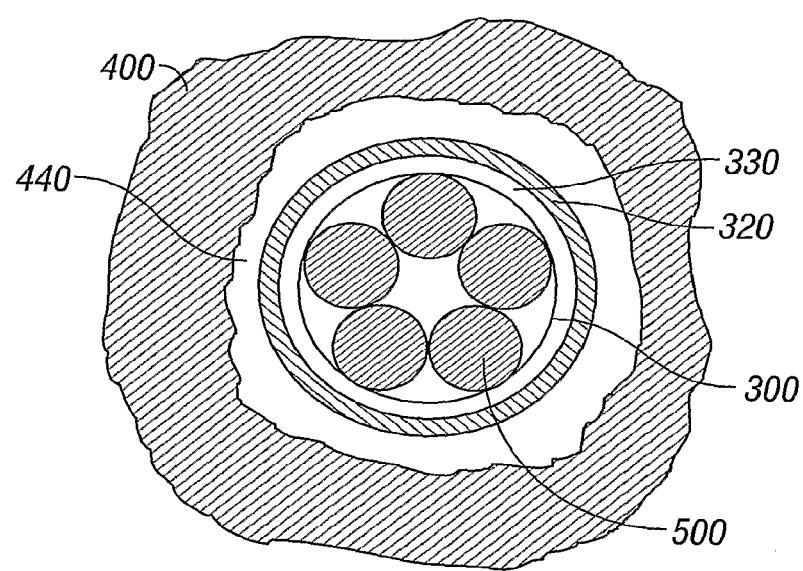
FIG. 5 is a sectional view of the continuous communications conduit of FIG. 4 as seen along the lines 5-5.

Referring now to FIGS. 3-5, another embodiment of the invention is shown as three conduit sections (301, 302, 303)

which may be joined with at least one weldment 400 (FIG. 4-5) to form a continuous communications conduit. A first conduit section 301 consists of a first external threaded section 331 on a first end 321 and an opposing second (external threaded) end 341. A second conduit section 302 consists of a first external threaded section 332 on a first end 322 and an opposing second (external threaded) end 342. Although the unengaged ends (341, 342) are shown as externally threaded, either or both may also be internally threaded or un-threaded.

A third conduit section 303 may contain an internal threaded section 333 along an internal surface. Although the third conduit section 303 is illustrated as having the same interior diameter and being threaded throughout the full length of its interior surface, the invention is not so limited. There may be a first and a second internal threaded section on opposing ends of the third conduit section 303. The line at 370 indicates the boundary between adjacent ends (321, 322) of the first 301 and second 302 conduit section and is located external to the heat shield conduit 320. The first 301 and second 302 conduit sections are not required to abut as shown 370 in FIG. 3 and/or there can be an unthreaded section (not shown) along the internal surface of the third conduit section 303 as in the first and second conduit sections (301, 302) Although the first 301 and second 302 conduit sections are illustrated with the same diameter and wall thickness, the diameter and/or wall thickness may differ with and/or within each conduit section. If a differing thread type, diameter, etc., a portion of the third conduit section 303 may be respectively sized to engage an end (321, 322) of the conduit section to be engaged thereto.

As used herein, the terms engagement, engage, or engaged shall refer to threadably attaching two conduit sections with at least one conduit section containing a threaded section. To threadably attach conduit sections, any means known in the art may be used, and may include manual or automatic means.

If both conduit sections ends to be joined are threaded, for example one internally and one externally threaded, the threaded ends do not have to form a fluid-tight seal. For example, the third conduit section 303 may have a threaded area with an inner diameter such that it does not threadably engage an end (321, 322) of one of the first or second conduit sections (301, 302). However, one of the first or second conduit sections (301, 302) may be disposed adjacent to a portion of the internal threaded surface 333 of the third conduit section 303 and a weldment 400 formed without departing from the spirit of the invention. The third conduit section 303 may be selected of an appropriate thickness and/or composition to provide additional material for forming the weldment 400 (if no separate flux or other material is used) between the third conduit section 303 and either or both of the first and second conduit sections (301, 302). There in no requirement that the conduit sections be of similar length or inner or outer diameter.

Optionally, a heat shield conduit 320 may be disposed within the first conduit section bore 311, the second conduit section bore 312, and/or the third conduit section bore 330. To locate the heat shield conduit 320 adjacent a desired area, a shoulder (351, 352) may be formed within a conduit section. In FIG. 3, the first conduit section 301 contains a first conduit section shoulder 351 and the second conduit section 302 contains a second conduit section shoulder 352. Although the heat shield conduit 320 is illustrated as being in contact with the first and second conduit section shoulders (351, 352), no contact is required. The heat shield 320 may be inserted within any of the longitudinal bores of the conduit sections (301, 302, 303) before at least one threaded engagement is formed. During threaded engagement, at least one of the shoulders (351, 352) may aid in disposing the heat shield conduit 320 to a desired location.

As discussed above in reference to FIG. 2, a heat shield conduit 320 may be constructed so at to provide a void 340 between a portion of an exterior surface of the heat shield conduit 320 and an inner surface of an adjacent conduit section (301, 302). This may protect the electrical conductor 300, if disposed within the heat shield conduit bore 330 during forming of a weldment, from heat or energy damage caused during weldment 400 formation. The heat shield conduit 320 (and void 340 if present) may be constructed and/or located as desired. For example, if a weldment 400 is desired along the entire length of the third conduit section 303, the heat shield conduit 320 and/or void 340 may be sized to extend substantially the same length as the entire threaded zone 350. Similarly, the first and/or second conduit section shoulders (351, 352) may be formed and/or located to allow the heat shield conduit 320 to be disposed in a desired location.

The first external threaded section 331 of the first conduit section 301 and the second external threaded section 332 of the second conduit section 302 may be constructed to provide a substantially continuous threaded section when abutting, for example both threaded sections (331, 332) being right handed threads or both being left handed threads. If so configured, the third conduit section 303 may be engaged to the first 301 and second 302 conduit sections, when the ends (321, 322) are abutting, without individually engaging or rotating the first 301 and second 302 conduit sections into engagement with the third conduit section 303.

Any embodiment of a continuous communications conduit may include an electrical conductor disposed therein (illustrated in FIG. 3 as 300). For example, if desired in the embodiment in FIGS. 1-2, an electrical conductor may be disposed within any or all of bores 111, 112, or 230.

As used herein, the phrase electrical conductor shall refer to any material or object that can permit an electrical current to flow or that is capable of transmitting another form of energy, for example heat, light, or sound. An electrical conductor may consist of or include an optical fiber. An electrical conductor may be capable of sending or receiving (or any combination thereof) a signal, data, or other form of energy. An electrical conductor or plurality of electrical conductors may be disposed through a bore through any means known in the art. For example, a fish tape may be utilized to aid in the disposition of an electrical conductor or plurality of electrical conductors through a bore. A magnetized element can be affixed to an end of an electrical conductor and disposed through the bore with the aid of a second magnetized element disposed outside the conduit. Pressurized fluid may also be utilized to aid in the disposition of an electrical conductor through the bore.

An electrical conductor 300 may be formed of more than one material or object that can permit an electrical current to flow or that is capable of transmitting another form of energy, for example heat, light, or sound. An electrical conductor 300 can be a monoconductor or an optical fiber. An electrical conductor 300 can be at least partially enclosed by a sheath (not shown) which may protect from causing and/or receiving abrasion or other damage and/or shield an electrical current or other form of energy from causing and/or receiving interference. The electrical conductor 300 can be selected to be sufficient for use with digital telemetry. The electrical conductor 300 can be used to connect a surface device to a downhole sensor, for example but not limited to, a high resolution quartz sensor, which is regularly used in wire line logging surveys.

To ease installation, an electrical conductor 300 may be disposed within the first conduit section bore 311, a heat shield conduit bore 330 (if present), a third conduit section bore, and a second conduit section bore 312 before the threaded sections are engaged and/or a weldment 400 (FIG. 4) is formed. The dotted portion of the weldment 400 is external to the heat shield conduit 320 in the sectional view of FIG. 4. The electrical conductor 300 can be disposed within the longitudinal bore created after the engagement of the first 301, second 302, and third 303 conduit sections, and if present, the bore 330 of the heat shield conduit 320. The electrical conductor 300 may be disposed within any of the longitudinal bores before or after the weldment 400 is formed.

Referring again to FIG. 4, the embodiment of FIG. 3 is shown with an optional elastomeric stabilizer (410 or 420) and one embodiment of a weldment 400. An elastomeric stabilizer (410, 420) may assist in centrally locating the electrical conductor 300 inside the heat shield conduit 320 and/or first 301, second 302, or third 303 conduit sections. The elastomeric stabilizer (410, 420) may be constructed of an elastomer compatible with the intensity and/or duration of heat or energy used in creating the weldment 400. Although a first 410 and second 420 elastomeric stabilizer are shown, one or more may be used without departing from the spirit of the invention. An elastomeric stabilizer (410, 420) may have an outer diameter sized substantially the same or smaller than an internal diameter of the bore of the conduit section containing said elastomeric stabilizer. An elastomeric stabilizer (410, 420) may have an inner diameter substantially the same size or larger than an outer diameter of an electrical conductor 300, which may include a sheath (not shown). Each elastomeric stabilizer (410, 420) may be sized relative to the dimensions of the conduit section it is disposed in. An elastomeric stabilizer 410 may be of the same or differing dimensions than another elastomeric stabilizer 420, if more than one is present.

If so desired, the electrical conductor 300 can be disposed through an elastomeric stabilizer (410, 420) or the elastomeric stabilizer (410, 420) can be split or otherwise constructed so as to allow disposition around the electrical conductor 300 without threading the electrical conductor 300 through an inner diameter of the elastomeric stabilizer (410, 420).

If present, a first (and if desired, a second) elastomeric stabilizer (410, 420) can be located adjacent an end of the heat shield conduit 320. Although the elastomeric stabilizers (410, 420) are shown directly contacting the heat shield conduit 320, the invention is not so limited. An elastomeric stabilizer (410, 420) may be disposed adjacent an end 341 of the first conduit section 301, an end 342 of the second conduit section 302, or anywhere therebetween. An elastomeric stabilizer (410, 420) may be disposed, at least partially, into a desired location in a bore by contact with either end of a heat shield conduit 320, if so equipped.

If it is desired that at least a portion of the electrical conductor 300 not contact the longitudinal bore 330 of the heat shield conduit 320, at least one elastomeric stabilizer (410, 420) may be disposed therein, for example substantially adjacent each end of the heat shield conduit 320. A void 440 (FIGS. 4 and 5) between the first, second, and/or third conduit sections (301, 302, 303) and the heat shield conduit 320 may be created by selecting a heat shield conduit 320 and/or a first, second, and/or third conduit sections (301, 302, 303) such that a portion of the outer surface of the heat shield conduit 320 is smaller than the inner diameter of the adjacent first, second, and/or third conduit section (301, 302, 303) to create said void 440. A heat or energy resistant material may be used at least partially in addition to and/or in replacement of said void 440. Similarly, the diameter of the heat shield conduit bore 330 and/or an outer diameter of the electrical conductor 300 may be sized to allow the electrical conductor 300 to be disposed therein without an exterior surface of the electrical conductor 300 contacting the inner surface of the heat shield conduit 320.

Figure 6:
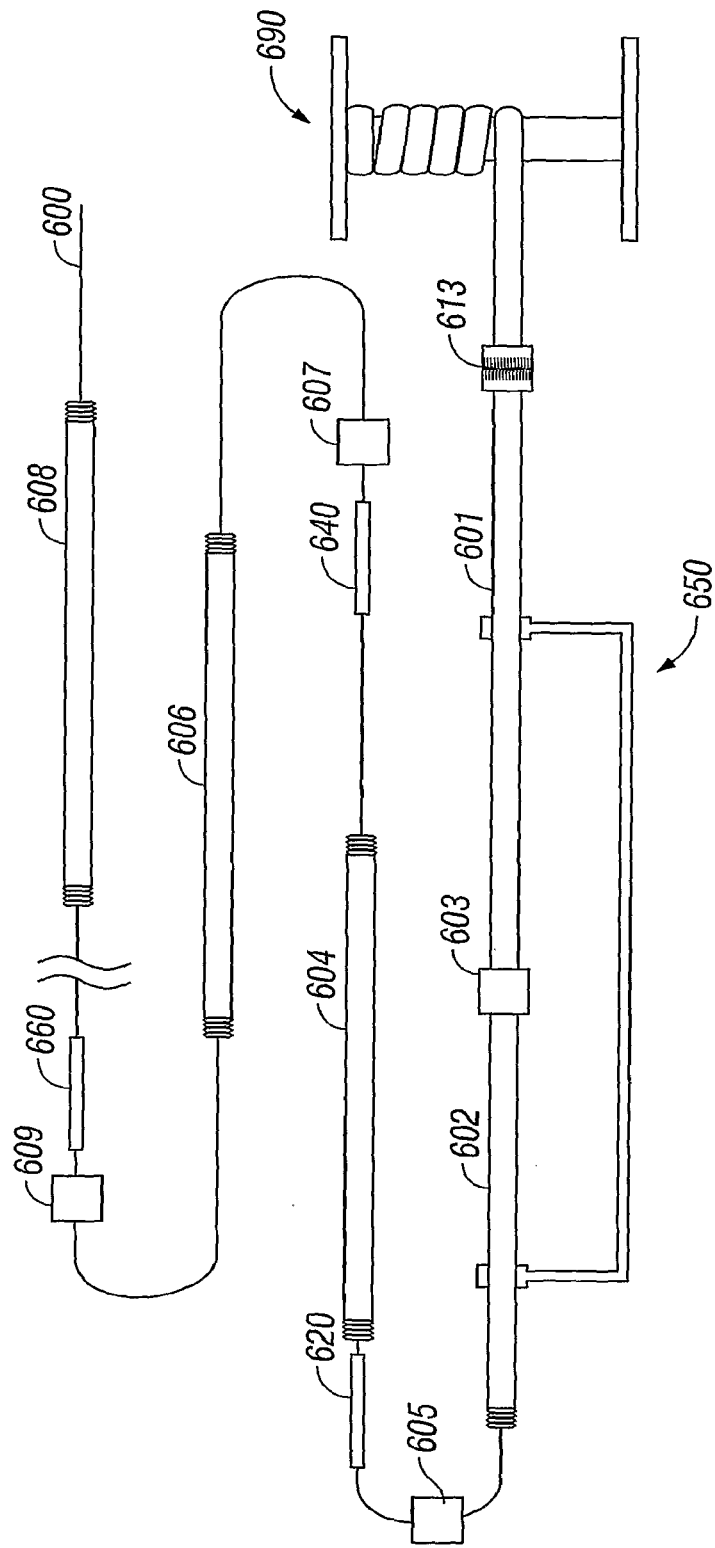
FIG. 6 is a schematic view of a method to create a continuous communications conduit, according to one embodiment of the invention.

Whether or not an elastomeric stabilizer (410, 420) is present, an electrical conductor 300 may also be placed in tension to aid against a portion of its exterior surface, which may or may not be sheathed, from contacting the inner bore 330 of the heat shield conduit 320. The electrical conductor 300 may be placed in tension to aid against a portion of its exterior surface from contacting an inner surface of any conduit section (301, 302, 303), independent of the presence or absence of an elastomeric stabilizer (410, 420). A conduit section may also be placed into tension, which may aid in assembly. Similarly, two or more conduit sections, which may include other conduit sections engaged therebetween, may be placed into tension or axially loaded after engagement. An axial load or tension may be imparted through any means known in the art, for example a stretching table or frame 650 (FIG. 6). This axial load or tension may align the conduit sections to be attached into a substantially parallel position before a weldment 400 is formed.

FIG. 5 is a sectional view down the axis of the apparatus of FIG. 4 as seen along the lines 5-5. The inner most element is an electrical conductor 300. For illustrative purposes, the electrical conductor 300 is shown as consisting of five individual conductor strands 500. However, the electrical conductor 300 can consist of a monoconductor (not shown), a plurality of conductor strands 500, or a plurality of electrical conductors (not shown). A conductor strand 500 may be any shape, size, or composition. An electrical conductor 300 or a conductor strand 500 may be or include an optical fiber. The area between the conductors, if a plurality are present, may further include a tie layer and/or an insulating layer. A sheath (not shown) may be disposed of on or adjacent an exterior surface of the electrical conductor 300 if so desired.

In the embodiment shown in FIGS. 4-5, adjacent the electrical conductor 300 is a heat shield conduit bore 330, followed by the heat shield conduit 320, and a void 440. External the void 440 is the weldment 400, which may join the third conduit section 303 to the first 301 and/or second conduit section 302. Although the weldment 400 is shown as fully penetrating to an inner diameter of the first and/or second conduit sections (301, 302), the invention is not so limited. The weldment 400 may (shown) or may not (not shown) fully penetrate the conduit section or sections (301, 302, 303) on which it may be formed. The weldment 400 may be at any point or area, for example along the threaded zone 350 (in FIG. 3). Although the weldment 400 is shown with a smooth inner and outer diameter, the weldment 400 may be irregular due to the weldment forming process. Additionally, the weldment 400 does not have to be disposed around a full circumference of the third conduit section 303 as shown in FIGS. 4-5. The weldment 400 may be a single weld or a plurality of welds. The joint created by this method of attachment is expected to have a tensile strength substantially equivalent to the tensile strength of an individual conduit section.

Referring now to FIG. 6, a plurality of conduit sections which may be used to form a continuous communications conduit with an electrical conductor 600 contained therein is shown. A least one of the conduit sections may be thin-walled. A conduit section (601, 602, 604, 606, 608) may have a plastic coating on at least a portion of its exterior surface.

The electrical conductor 600 may be disposed through the bores of the conduit sections and heat shield conduit (if desired). A first conduit section 601 with an external threaded end can be attached to an internal threaded section of a third conduit section 603. An external threaded end of a second conduit section 602 can be threadably attached to an opposing internal threaded section of the third conduit section 603. If so desired, an optional stretching table 650 may be utilized to impart an axial load or tension to the first 601, second 602, and third 603 conduit section assembly. Tension or an axial load may also be imparted to at least a portion of the electrical conductor 600 if so desired. At least one elastomeric stabilizer (not shown) may be used. It may be installed on the electrical conductor 600 before or after the electrical conductor 600 is threaded through a conduit section. If installed after threading, the elastomeric stabilizer may be split to allow installation.

After engaging the threaded sections, a weldment can then be formed, as shown on conduit section 613, creating a length of continuous communications conduit with an electrical conductor 600 contained therein. After weldment formation, a portion of the length of continuous communications conduit may be stored, for example on a spool 690. The storage device may vary depending on the properties of the continuous communications conduit. The third conduit section 603, which may be threaded, can provide additional material for the weldment forming process if either or both of the conduit sections to be attached (601, 602) are thin-walled.

After formation, the unattached, external threaded section of the second conduit section 602 may be engaged to one end of an internal threaded fifth conduit section 605. The opposing end of the internal threaded fifth conduit section 605 may be engaged to a threaded section of a fourth conduit section 604. If so desired, an optional heat shield conduit 620 may be disposed of on the electrical conductor 600. A heat shield conduit (620, 640, 660) may be inserted prior to joining two adjacent conduit sections if the heat shield conduit is capable of being inserted without threading through a bore of the heat shield conduit. A heat shield conduit may be disposed at a preferred location by contact with a shoulder, if so equipped, in at least one of the conduit sections during the engagement process.

Optionally, the assembly of the second 602, fifth 605, and fourth 604 conduit sections may then be axially loaded or placed in tension by the stretching table 650. After engagement and/or axial loading, a weldment may then be formed to add to the length of continuous communications conduit (601, 602, 603) already formed. A portion of this length may then be disposed of on the spool 690 and the process repeated with the next adjacent conduit sections (606, 607). The number of conduit sections used is not limited. An inventory shall mean a plurality of conduit sections and does not require the conduit sections be identical.

A portion or all of the steps to form a continuous communications conduit may occur on-site. As used herein, on-site shall refer to a location at or near a location where a continuous communications conduit may be used. For example, a length of continuous communications conduit may be formed adjacent to a wellbore such that a length may be disposed downhole instead of being stored. A length of continuous communications conduit can also be formed on-site and stored on a spool 690 or other storage device until used.

To use, a desired length of continuous communications conduit is acquired or formed. A length of the continuous communications conduit may be inserted or disposed within a wellbore to a location of interest in the earth. The may occur during or after drilling. A continuous communications conduit can be attached to at least a portion of a drill string or other tubing. A tool, sensor, or other device may be attached to one end of the desired length of continuous communications conduit.

Each threaded section may be internal or external threaded. Although the terms internal and external threaded section are used in reference to specific embodiments of the invention, the terms are used by way of illustration for the sake of clarity and convenience. Any of the steps of forming a continuous communications conduit can occur in a horizontal or vertical orientation, or any orientation therebetween.

Numerous embodiments and alternatives thereof have been disclosed. While the above disclosure includes the best mode belief in carrying out the invention as contemplated by the named inventor, not all possible alternatives have been disclosed. The scope and limitation of the present invention is not to be restricted to the above disclosure, but is instead to be defined and construed by the appended claims.

What is claimed is:

1. A continuous thin-walled communications conduit for use in a well comprising:
    a first flexible conduit section having a threaded end and a longitudinal bore therethrough;
    a second flexible conduit section having a threaded end and a longitudinal bore therethrough;
    a third conduit section having a threaded first end threadably attached to the threaded end of the first conduit section and an opposing threaded second end threadably attached to the threaded end of the second conduit section, said third conduit section having a longitudinal bore therethrough in communication with the longitudinal bores of the first and second conduit sections;
    a weldment of the first, second and third conduit section threads joining the three conduit sections together.

2. The continuous communications conduit of claim 1 further comprising a heat shield conduit contained within the longitudinal bore of the first, second, and third conduit sections, said heat shield conduit extending substantially a longitudinal length of the third conduit section.

3. The continuous communications conduit of claim 2 wherein the heat shield conduit is further disposed between a first conduit section shoulder and a second conduit section shoulder.

4. A continuous thin-walled communications conduit for use in a well comprising:
    an electrical conductor disposed through a longitudinal bore of a first conduit section, a longitudinal bore of a heat shield conduit, a longitudinal bore of a second conduit section, and a longitudinal bore of a third conduit section;
    said first conduit section having an external threaded section on a first and a second end;
    said second conduit section having an external threaded section on a first and a second end;
    said third conduit section having an internal threaded first section threadably attached to one of the external threaded sections of the first conduit section and an opposing internal threaded second section threadably attached to one of the external threaded sections of the second conduit section, wherein the longitudinal bore of third conduit section is in communication with the longitudinal bores of the first and second conduit sections;
    a weldment joining at least a first portion of the engaged threads of the third conduit section to the engaged threads of the first conduit section and said weldment joining at least a second portion of the engaged threads of the third conduit section to the engaged threads of the second conduit section; and said heat shield conduit disposed within the longitudinal bores of the first, second, and third conduit sections and extending substantially from a first conduit section shoulder located proximate the threadably attached end of the first conduit section to a second conduit section shoulder located proximate the threadably attached end of the second conduit section.

5. The continuous thin-walled communications conduit for use in a well of claim 4 wherein said first conduit section shoulder is formed in an inner surface of said first conduit section and said second conduit section shoulder is formed in an inner surface of the second conduit section.

6. The continuous thin-walled communications conduit for use in a well of claim 4 wherein an outer diameter of a first and a second section located at a first and an opposing second end of the heat shield conduit is greater than that of an outer diameter at a middle section.

7. The continuous thin-walled communications conduit for use in a well of claim 4 wherein at least a portion of an outer diameter of a section of the heat shield conduit adjacent said weldment is smaller than an inner diameter of the longitudinal bore of the first conduit section.

8. The continuous thin-walled communications conduit for use in a well of claim 4 further comprising an elastomeric stabilizer located proximate an end of the heat shield conduit with an inner diameter substantially the size of an outer diameter of the electrical conductor and an outer diameter substantially the size of an inner diameter of the longitudinal bore of the conduit section containing said elastomeric stabilizer.

9. A method of fabricating a continuous thin-walled communications conduit for use in a well comprising:
    disposing an electrical conductor through a longitudinal bore of a first conduit section, a longitudinal bore of a heat shield conduit, a longitudinal bore of a third conduit section, and a longitudinal bore of a second conduit section;
    attaching an external threaded section located on an end of the first conduit section to an internal threaded section on a first end of the third conduit section;
    attaching an external threaded section located on an end of the second conduit section to an internal threaded section on an opposing second end of the third conduit section, said heat shield conduit disposed in the longitudinal bore of the first, second, and third conduit sections and disposed between a first conduit section shoulder located proximate the threadably attached end of the first conduit section and a second conduit section shoulder located proximate the threadably attached end of the second conduit section after the attachment steps; and
    forming a weldment joining at least a first portion of the engaged threads of the third conduit section to the engaged threads of the first conduit section and said weldment joining at least a second portion of the engaged threads of the third conduit section to the engaged threads of the second conduit section.

10. The method of fabricating a continuous thin-walled communications conduit for use in a well of claim 9 wherein said heat shield conduit is displaced into the longitudinal bore of the first, second, and third conduit sections by contact with at least one of the shoulders.

11. The method of fabricating a continuous thin-walled communications conduit for use in a well of claim 9 wherein said weldment comprises a single weld joint.

12. The method of fabricating a continuous thin-walled communications conduit for use in a well of claim 9 wherein said weldment comprises a plurality of weld joints.

13. The method of fabricating a continuous thin-walled communications conduit for use in a well of claim 9 further comprising axially loading the first and second conduit sections before forming the weldment.

14. The method of fabricating a continuous thin-walled communications conduit for use in a well of claim 9 further comprising winding at least a portion of the continuous thin-walled communications conduit on a spool.

15. The method of fabricating a continuous thin-walled communications conduit for use in a well of claim 9 further comprising disposing an elastomeric stabilizer on the electrical conductor, said elastomeric stabilizer having an external diameter less than the inner diameter of the longitudinal bore containing said elastomeric stabilizer.

16. A method of fabricating a continuous thin-walled communications conduit for use in a well comprising:
    obtaining an inventory of individual sections of a continuous thin-walled communications conduit;
    disposing an electrical conductor through a longitudinal bore of a first conduit section, a longitudinal bore of a heat shield conduit, a longitudinal bore of a third conduit section, and a longitudinal bore of a second conduit section;
    locating a threaded end of the first conduit section adjacent a threaded end of the second conduit section;
    disposing the third conduit section over the threaded end of the first and second conduit sections, said third conduit section having an inner diameter greater than an outer diameter of the first and second conduit sections;
    locating the heat shield conduit adjacent the threaded ends of the first and second conduit sections and between a first conduit section shoulder and a second conduit section shoulder; and
    forming a weldment joining the third conduit section to the first conduit section and the second conduit section.

17. The method of fabricating a continuous thin-walled communications conduit for use in a well of claim 9 further comprising:
    disposing the electrical conductor through a longitudinal bore of a fourth conduit section, a longitudinal bore of a second heat shield conduit, and a longitudinal bore of a fifth conduit section;
    locating a second threaded end of the second conduit section adjacent a threaded end of a fourth conduit section;
    disposing the fifth conduit section over the threaded end of the second and fourth conduit sections, said fifth conduit section having an inner diameter greater than an outer diameter of the second and fourth conduit sections;
    locating the second heat shield conduit adjacent the threaded ends of the second and fourth conduit sections and between a second shoulder in the second conduit section and a fourth conduit section shoulder; and
    forming a second weldment joining the fifth conduit section to the second conduit section and the fourth conduit section.

18. A flexible continuous communications conduit formed by joining two or more shorter continuous communications conduits comprising:
    an externally threaded end of a first flexible continuous conduit;
    an externally threaded end of second flexible continuous conduit;
    connecting the external threads on the first continuous flexible conduit and the threads on the second continuous flexible conduit by threading each into an internally threaded third conduit; and, a weldment on both the first continuous flexible conduit and the second continuous flexible conduit within the externally threaded connections with the third conduit forming an integral engagement of the first and second continuous flexible conduits with the third conduit.

19. The continuous communications conduit of claim 18 wherein a heat shield conduit is inserted adjacent the welded connections.

* * * * *